(12) United States Patent
Liou et al.

(10) Patent No.: US 11,644,710 B2
(45) Date of Patent: May 9, 2023

(54) DISPLAY PANEL AND ELECTRONIC DEVICE

(71) Applicant: InnoLux Corporation, Miao-Li County (TW)

(72) Inventors: Yun-Chun Liou, Miao-Li County (TW); Yen-Chi Chang, Miao-Li County (TW); Yu-Ting Chen, Miao-Li County (TW); Bo-Yu Wu, Miao-Li County (TW); Mei-Jie Yang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/840,069

(22) Filed: Jun. 14, 2022

(65) Prior Publication Data

US 2023/0017479 A1    Jan. 19, 2023

(30) Foreign Application Priority Data

Jul. 19, 2021 (CN) .......................... 202110814039.7

(51) Int. Cl.
*G02F 1/1335* (2006.01)
*G02F 1/1333* (2006.01)

(52) U.S. Cl.
CPC .... *G02F 1/133512* (2013.01); *G02F 1/13338* (2013.01)

(58) Field of Classification Search
CPC ............ G02F 1/133512; G02F 2201/58; G02F 1/13318; G02F 1/13312; G02F 1/133331
See application file for complete search history.

(56) References Cited

U.S. PATENT DOCUMENTS

| 11,210,492 B2 | 12/2021 | Yang et al. | |
| 2011/0017280 A1 | 1/2011 | Rumsby | |
| 2012/0170284 A1* | 7/2012 | Shedletsky | G01J 1/0407 362/355 |
| 2021/0215973 A1* | 7/2021 | Wang | G02F 1/133605 |
| 2022/0301511 A1* | 9/2022 | Nakatogawa | G02F 1/136286 |

FOREIGN PATENT DOCUMENTS

| CN | 101971363 B | 4/2013 |
| CN | 108899344 A | 11/2018 |

OTHER PUBLICATIONS

Chinese language office action dated Feb. 20, 2023, issued in application No. TW 111111273.

* cited by examiner

*Primary Examiner* — Jessica M Merlin
(74) *Attorney, Agent, or Firm* — McClure, Qualey & Rodack, LLP

(57) ABSTRACT

A display panel is provided. The display panel includes a sensing region. The display panel includes a capping substrate, a light shielding layer, and a transparent material. The light shielding layer is disposed under the capping substrate. The light shielding layer includes a plurality of holes. The transparent material is disposed under the light shielding layer. The plurality of holes and the transparent material correspond to the sensing region.

20 Claims, 7 Drawing Sheets

140D

143D

140E

143E

DISPLAY PANEL AND ELECTRONIC DEVICE

CROSS REFERENCE TO RELATED APPLICATIONS

This application claims the benefit of China Patent Application No. 202110814039.7, filed Jul. 19, 2021, the entirety of which is incorporated by reference herein.

BACKGROUND OF THE INVENTION

Field of the Invention

The present disclosure relates to a display panel and an electronic device. In particular, the present disclosure relates to a display panel and an electronic device including a sensing element.

Description of the Related Art

Electronic devices including a display panel (examples of electronic devices include a tablet computer, a notebook, a smartphone, a display device, a television, and the like) have become necessary products in modern society. As these convenient electronic devices grow in popularity, customers have high expectations on the quality, functionality, or affordability of these products.

Electronic devices may be provided with a sensing element. Customers expect not seeing the sensing region and/or the sensing element with the naked eye. That is, the visibility of the sensing region and/or the sensing element has to be reduced.

BRIEF SUMMARY OF THE INVENTION

According to some embodiments, a display panel is provided. The display panel includes a sensing region. The display panel includes a capping substrate, a light shielding layer, and a transparent material. The light shielding layer is disposed under the capping substrate. The light shielding layer includes a plurality of holes. The transparent material is disposed under the light shielding layer. The plurality of holes and the transparent material correspond to the sensing region According to some embodiments, an electronic device is provided. The electronic device includes a sensing element and a display panel. The display panel includes a sensing region corresponding to the sensing element. The display panel includes a capping substrate, a light shielding layer, and a transparent material. The capping substrate is disposed above the sensing element. The light shielding layer is disposed between the capping substrate and the sensing element and including a plurality of holes. The transparent material is disposed between the capping substrate and the sensing element. The holes and the transparent material correspond to the sensing region.

BRIEF DESCRIPTION OF THE DRAWINGS

The present disclosure can be more fully understood by reading the subsequent detailed description and examples with references made to the accompanying drawings. It should be noted that, various features may be not drawn to scale. In fact, the dimensions of the various features may be arbitrarily increased or decreased for clarity of discussion, and the various features may be drawn schematically.

DETAILED DESCRIPTION OF THE INVENTION

Figure 1:
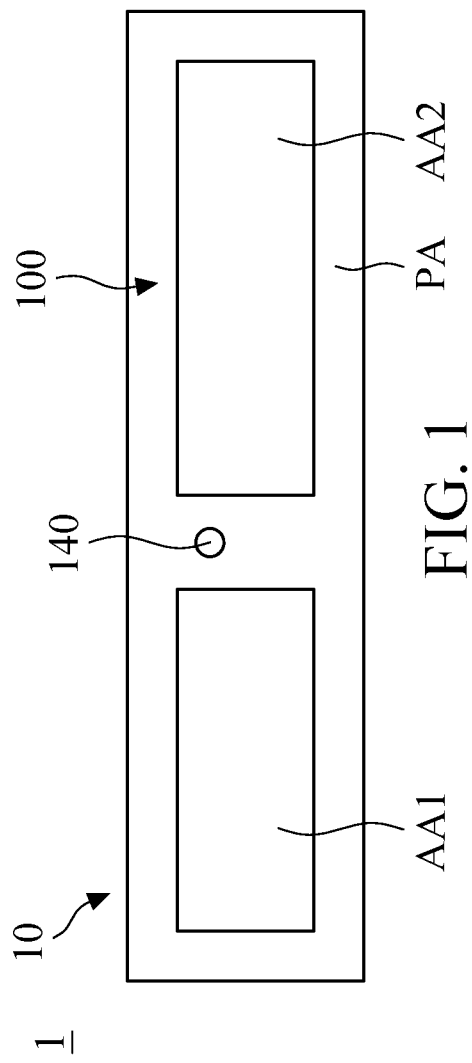
FIG. 1 is a top view of an electronic device, in accordance with some embodiments.

The following description provides many different embodiments, or examples, for implementing different features of the present disclosure. Ordinal terms such as "first", "second", etc., used in the description and claims do not by themselves connote any priority, precedence, or order of one element over another, but are used merely as labels to distinguish one element from another element having the same name. In addition, in different examples of this disclosure, similar and/or corresponding symbols or alphabets may be used repeatedly. These similar and/or corresponding symbols or alphabets are used for the sake of clear description of some embodiments of the present application, and they do not dictate any relationship between different embodiments and/or structures.

The present disclosure may be understood from the following description in accompany with the drawings. In should be noted that, for simplification, in the drawings, it's possible that only part of the electronic device is illustrated. In addition, the number/amount and the dimensions merely serve as examples, and they are not intended to limit the scope of the present disclosure. It should be noted that, the elements and devices may exist in various forms. In this specification, relative expressions may be used. For example, "higher" and "lower" may be used to describe the position of one element relative to another. It should be noted that, if a device of the drawings is flipped upside down, an element that is "higher" will become an element that is "lower".

When a corresponding component (such as a film layer or a region) is referred to as "on another component", it may be directly on another component, or there may be other components therebetween. On the other hand, when a component is referred "directly on another component", there is no component therebetween. In addition, when a component is referred "on another component", the two components have an up-down relationship in the top view, and this component can be above or under the other component, and this up-down relationship depends on the orientation of the device.

In this specification, the words "including", "comprising", "having", and the like are open words, so they should be interpreted as meaning "including but not limited to . . . ". Therefore, when the words "including", "comprising", "having", and the like are used in the description of this disclosure, the presence of corresponding features, regions, steps, operations and/or components is specified, and without excluding the presence of one or more other features, regions, steps, operations and/or components.

In this specification, words "about" or "substantially" are generally interpreted as within 10%, 5%, 3%, 2%, 1%, or 0.5% of a given value or range. In addition, words "the range is between a first value and a second value" represent the range includes the first value, the second value, and other values between the first value and the second value.

Furthermore, in some embodiments of the present disclosure, the thickness, length, and width can be measured using an optical microscope or an electron microscope, but it is not limited thereto. In addition, a certain error may be present in a comparison with any two values or directions. If a first direction is perpendicular to a second direction, the angle between the first direction and the second direction may be between 80 degrees and 100 degrees. If the first direction is parallel with the second direction, the angle between the first direction and the second direction may be between 0 degrees and 10 degrees.

Unless defined otherwise, all terms (including technical and scientific terms) used herein have the same meaning as commonly understood by those skilled in the art. It should be appreciated that, the terms, which are defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

The electronic device of the present disclosure may include a display device, an antenna device, a sensing device, a light emitting device, or a tiled device, but it is not limited thereto. The electronic device may include a bendable, a curved or flexible electronic device. The electronic device 10 may include a light-emitting layer or a light-emitting diode (LED). The light-emitting diode may include organic light-emitting diode (OLED), inorganic light-emitting diode, mini LED, micro LED, quantum dot (QD) light-emitting diode (which may be referred to as QLED, QDLED), fluorescence, phosphor, another suitable material, or a combination thereof, but it is not limited thereto. In the following description, the display device may be used as an example of the electronic device, but the present disclosure is not limited thereto.

Figure 2:
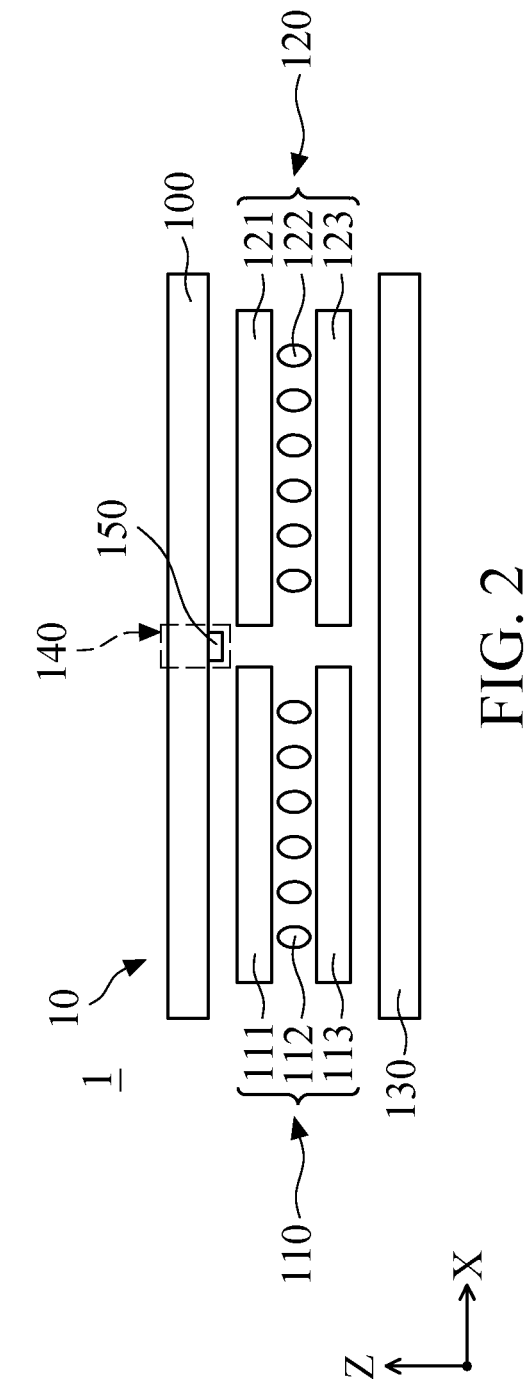
FIG. 2 is a side view of the electronic device, in accordance with some embodiments.

Please refer to FIG. 1 and FIG. 2. FIG. 1 is a top view of an electronic device 1 in some embodiments. FIG. 2 is a side view of the electronic device 1 in some embodiments. It should be noted that, for clarity of illustration, some elements of the electronic device 1 are omitted, and only some of the other elements are schematically illustrated. In some embodiments, additional elements may be added to the electronic device 1, and/or some elements of the electronic device 1 may be replaced or omitted. The electronic device 1 may include a display panel 10. The display panel 10 of the present disclosure may include a device that cannot emit light itself. Such device may be a liquid crystal display device, but it is not limited thereto. In some embodiments, the electronic device 1 may include a sensing element 150. The sensing element 150 may include an ambient light sensor (ALS), an infrared sensing element, or another sensing element, to sense a change in brightness or another environmental condition (such as temperature or humidity). For example, the display light may be the light from the display panel 10, and the environmental light may be the light from the environment. An ambient light sensor may be used to detect changes in the environmental light and to control the brightness of the display panel 10 according to the brightness of the environment, to improve user experience. Furthermore, an ambient light sensor may save energy and further extend the lifetime of the display panel 10. In this embodiment, an ambient light sensor may be used as an example of the sensing element 150, but it is not limited thereto.

The display panel 10 may include a capping substrate 100, a first display unit 110, a second display unit 120, a backlight module 130, and a light shielding layer 160. (The light shielding layer 160 is not illustrated in FIG. 1 and FIG. 2, so please refer to FIG. 3 and FIG. 4 for details of the light shielding layer 160.)

In this embodiment, the display panel 10 may include multiple display regions (such as a first display region AA1 and a second display region AA2) and a peripheral region PA, wherein the display regions are those regions that are able to display images, the peripheral region is the region that is adjacent to the display regions and not able to display images, but it is not limited thereto. In this embodiment, the first display unit 110 may be disposed to correspond to the first display region AA1, and the second display unit 120 may be disposed to correspond to the second display region AA2. Furthermore, in this embodiment, the peripheral region PA may include a sensing region 140, wherein the sensing region 140 is the region that corresponds to the sensing element 150, but it is not limited thereto. The details of the sensing region 140 and the sensing element 150 may be found in FIG. 3 and FIG. 4.

In this embodiment, one sensing element 150 and two display units (i.e. the first display unit 110 and the second display unit 120) are illustrated, and the sensing element 150 may control the brightness of the first display unit 110 and the brightness of the second display unit 120 at the same time. In some other embodiments, the sensing element 150 may control the brightness of a single display unit. In some other embodiments, the sensing element 150 may control the brightness of multiple display units. Alternatively, the display panel 10 may include more sensing elements and/or more display units, and each sensing element may control the brightness of one or more display units, independently.

As shown in FIG. 1 and FIG. 2, from a top view of the display panel 10, the first display unit 110 is disposed to correspond to the first display region AA1, the second display unit 120 is disposed to correspond to the second display region AA2, the peripheral region PA surrounds the first display region AA1 and the second display region AA2, and the sensing element 150 is disposed in the peripheral region PA. It should be noted that the term "correspond to" used in this specification means the elements at least partially overlap in the normal direction of the surface of the capping substrate 100 (such as the Z-direction). For example, from a top view, the first display unit 110 and the first display region AA1 may at least partially overlap. For example, the edge of the first display unit 110 may not be able to display images, so the area of the first display region AA1 may be smaller than the area of the first display unit 110.

The capping substrate 100 is disposed above the first display unit 110, the second display unit 120, and the sensing element 150. The capping substrate 100 may protect the first display unit 110, the second display unit 120, and/or the sensing element 150. The capping substrate 100 may include a hard substrate or a flexible substrate. For example, the material of the capping substrate 100 may include glass, polycarbonate (PC), polyimide (PI), polyethylene terephthalate (PET), other suitable materials, and combinations thereof, but it is not limited thereto.

The first display unit 110 and the second display unit 120 are disposed between the capping substrate 100 and the backlight module 130. The capping substrate 100 and the backlight module 130 may be shared by the first display unit 110 and the second display unit 120 to simplify the manufacturing process and/or reduce costs. The size of the first display unit 110 may be different from the size of the second display unit 120. The functionality of the first display unit 110 may be different from the second display unit 120. In some embodiments, the electronic device 1 may be disposed in cars or electric vehicles. For example, the first display unit 110 may be used as a dashboard to display the speedometer, fuel gauge, and the like, and the second display unit 120 may be used as a central control unit to control the temperature inside the car, to play music, and the like, but it is not limited thereto. It should be noted that, although the use of the electronic device 1 in cars or electric vehicles is described, the present disclosure may also be applied to other electronic devices that include a sensing element, such as tablet computers, notebooks, smartphones, and the like.

In some embodiments, the first display unit 110 may include a substrate 111, a display medium layer 112, and a substrate 113. The second display unit 120 may include a substrate 121, a display medium layer 122, and a substrate 123. The substrate 111, the substrate 113, the substrate 121, and the substrate 123 may include a flexible and a non-flexible substrate. For example, the substrate 111, the substrate 113, the substrate 121, and the substrate 123 may include glass, quartz, polycarbonate (PC), polyimide (PI), polypropylene (PP), polyethylene terephthalate (PET), another suitable material, or a combination thereof, but it is not limited thereto.

The display medium layer 112 and/or the display medium layer 122 may include liquid crystal, a light-emitting diode (LED), and the like. For example, the type of liquid crystal may include twisted nematic (TN) liquid crystal, super-twisted nematic (STN) liquid crystal, vertical alignment (VA) liquid crystal, in-plane switching (IPS) liquid crystal, cholesteric liquid crystal, fringe field switching (FFS) liquid crystal, another suitable liquid crystal, or a combination thereof, but it is not limited thereto. The light-emitting diode may include organic light-emitting diode (OLED), inorganic light-emitting diode, mini LED, micro LED, quantum dot (QD) light-emitting diode (which may be referred to as QLED, QDLED), another suitable material, or a combination thereof, but it is not limited thereto.

The backlight module 130 may include one or more light-emitting elements for providing light to the first display unit 110 and the second display unit 120. In this embodiment, the backlight module 130 is adjacent to the substrate 113 and the substrate 123. The light provided by the backlight module 130 may sequentially pass through the substrate 113, the display medium layer 112, the substrate 111, and the capping substrate 100, and then leave the electronic device. The light provided by the backlight module 130 may also sequentially pass through the substrate 123, the display medium layer 122, the substrate 121, and the capping substrate 100, and then leave the electronic device.

In addition, the light-emitting elements inside the backlight module 130 may include a light-emitting diode (LED), a lamp (such as a cold cathode fluorescent lamp (CCFL)), or another suitable light-emitting element. The light-emitting diode may include organic light-emitting diode (OLED), inorganic light-emitting diode, mini LED, micro LED, quantum dot (QD) light-emitting diode (which may be referred to as QLED or QDLED), another suitable light-emitting diode, or a combination thereof, but it is not limited thereto. In some embodiments, the backlight module 130 may include a direct-type backlight module or a side-light type backlight module.

To reduce the possibility that the brightness of the first display unit 110 and the brightness of the second display unit 120 will interfere with the sensing of the sensing element 150, the light shielding layer 160 is disposed (such as using a coating process) under the capping substrate 100 in some embodiments. For example, the light shielding layer 160 may be disposed between the capping substrate 100 and the sensing element 150. The light shielding layer 160 may include any suitable light shielding material, including ink.

Figure 3:
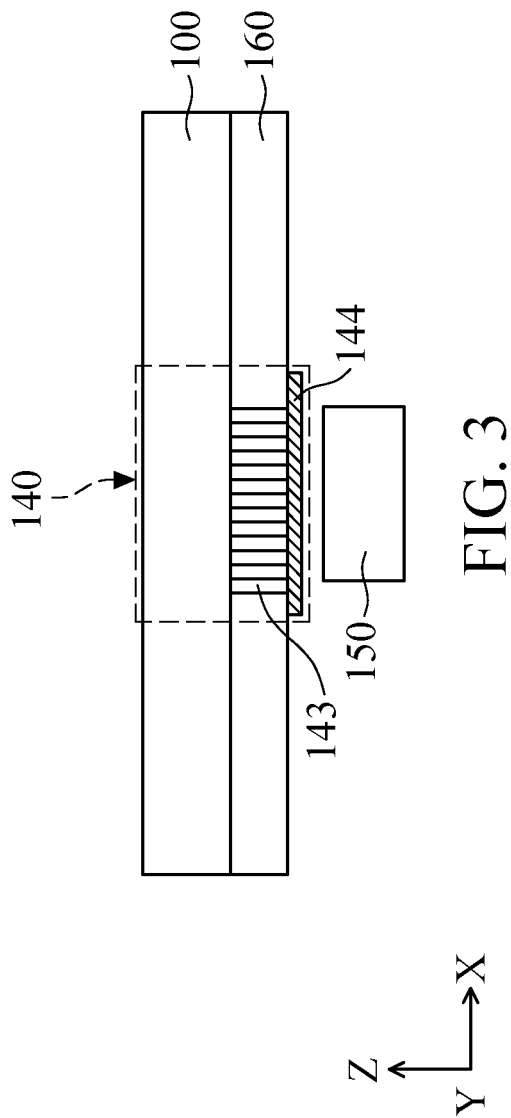
FIG. 3 is a side view of a sensing region and a sensing element, in accordance with some embodiments.

FIG. 3 is a side view of the sensing region 140 and the sensing element 150, in accordance with some embodiments. As described above, the sensing region 140 corresponds to the sensing element 150. The display panel 10 (please refer to FIG. 2) further includes a plurality of holes 143 and a transparent material 144. The light shielding layer 160 includes the holes 143. In other words, the light shielding layer 160 is penetrated to form the holes 143. The transparent material 144 is disposed under the light shielding layer 160. For example, the transparent material 144 may be disposed between the capping substrate 100 and the sensing element 150.

The holes 143 may be formed by any suitable method. In some embodiments, the holes 143 are formed by a laser ablation process or processes that include a lithography process and an etching process. In some embodiments, using a laser ablation process may control the consistency of the shape, the area, the volume, and/or the arrangement of each of the holes 143.

The transmittance of the transparent material 144 may include different ranges according to actual needs or the selection of materials. In some embodiments, the transmittance of the transparent material 144 may be between 70% and 99.5% (70%≤ the transmittance of the transparent material 144≤99.5%), such as 85%, 90%, 95%, 98%, or 99.5%, but it is not limited thereto. In some embodiments, the transmittance of the transparent material 144 may be between 85% and 98% (85%≤the transmittance of the transparent material 144≤98%), such as 85%, 90%, 95%, or 98%, but it is not limited thereto. In some embodiments, the transparent material 144 may be an adhesive tape material or glue. Examples of adhesive tape material may include optical clear adhesive (OCA) optical tape, double-sided tape, or another suitable adhesive tape material. In addition, in some embodiments, the holes 143 may be filled with the transparent material 144, or the transparent material 144 may be disposed under the holes 143, but it is not limited thereto. In some embodiments, the holes 143 are filled with a portion of the transparent material 144, and the underside of the holes 144 is coated with another portion of the transparent material 144, but it is not limited thereto. In some other embodiments, the transparent material 144 and the light shielding layer 160 partially overlap in the normal direction of the capping substrate 100 (the Z-direction), thereby reducing the possibility of the transparent material 144 coming off.

Since the transparent material 144 may increase the amount of transmission of the light that can pass through and/or reduce the amount of reflection of the light that can pass through, some embodiments of the present disclosure may reduce the visibilities of the sensing region 140 and/or the sensing element 150. In particular, based on the present disclosure, when a user uses the electronic device 1, he or she can barely see the sensing region 140 and/or the sensing element 150 with the naked eye, thereby enhancing user experience. For example, the refraction index of the transparent material 144 may be different from the refraction index of the capping substrate 100, and the reflection coefficient of the transparent material 144 may be different from the reflection coefficient of the capping substrate 100. However, by suitably selecting the refraction index and the reflection coefficient of the transparent material 144 and the capping substrate 100, the amount of the light that can pass through may be increased, which helps the sensing element 150 to sense changes in the environmental light. Alternatively, the amount of reflection of the light that can pass through is decreased, which reduces the possibility of the sensing region 140 and the sensing element 150 being visible to the naked eye.

It should be noted that the following parameters may be adjusted to control the transmittance $T_r$ of the sensing region 140. These parameters include the area A of the sensing element 150, the total area a of the holes 143, and the transmittance $T_s$ of the capping substrate 100. In some embodiments, the transmittance $T_r$ of the sensing region 140 is defined by Equation 1:

$$T_r\% = \frac{a}{A} \times T_s\% \qquad \text{(Equation 1)}$$

A: the area of the sensing element 150;
a: the total area of the holes 143;
$T_r$: the transmittance of the sensing region 140; and
$T_s$: the transmittance of the capping substrate 100.

In some embodiments, after the sensing element 150 is determined, the area A of the sensing element 150 may be determined, and the total area a of the holes 143 and/or the transmittance $T_s$ of the capping substrate 100 may be determined accordingly. In cases where the sensing element 150 is determined first, when the total area a of the holes 143 is greater and/or the transmittance $T_s$ of the capping substrate 100 is higher, the transmittance $T_r$ of the sensing region 140 is higher. In some embodiments, the capping substrate 100 may be determined first to determine the transmittance $T_s$ of the capping substrate 100, and the area A of the sensing element 150 and/or the total area a of the holes 143 may be determined accordingly. In cases where the capping substrate 100 is determined first, when the area A of the sensing element 150 is smaller and/or the total area a of the holes 143 is greater, the transmittance $T_r$ of the sensing region 140 is higher.

In some embodiments, the sensing element 150 is substantially circular-shaped, and its radius R is between 300 millimeters (mm) and 1500 mm (300 mm≤the radius R≤1500 mm), and the area A of the sensing element 150 may be calculated accordingly. In some embodiments, the radius R of the sensing element 150 may be about 500 mm. In some embodiments, each of the holes 143 may be substantially circular-shaped, and its radius r is between 15 micrometers (µm) and 80 µm (15 µm≤the radius r≤80 µm), such as 20 µm, 30 µm, 40 µm, 50 µm, 60 µm, or 70 µm, but it is not limited thereto. Also, the total area a of the holes 143 may be calculated accordingly. The transmittance $T_s$ of the capping substrate 100 may include different ranges according to actual needs or the selection of materials. In some embodiments, the transmittance $T_s$ of the capping substrate 100 may be between 70% and 95% (70%≤the transmittance $T_s$≤95%), such as 70% or 90%, but it is not limited thereto. In this embodiment, the area of the sensing element 150 may be defined as the area enclosed by the contour of the sensing element 150 from the top view. In some embodiments, the sensing element 150 may be regular-shaped, such as square-shaped, rectangular-shaped, or triangular-shaped, and the related formulae may be used to calculate the area. For example, if the sensing element 150 is rectangular-shaped, then its area is equal to the product of the adjacent sides (i.e., the product of the length and the width). In some other embodiments, the sensing element 150 may be irregular-shaped, and its area may be defined as the area of a minimum circle, which is drawn based on the contour of the sensing element 150, but it is not limited thereto. In addition, the area and corresponding calculation of each of the holes 143 may be similar to those of the sensing element 150, but it is not limited thereto. For example, if the contour of the holes 143 is rectangular-shaped from the top view, then the area of the holes 143 equals the product of the adjacent sides (i.e., the product of the length and the width). In addition, in this embodiment, the unit of area may be $mm^2$ or $µm^2$, but it is not limited thereto.

Based on the calculation, it may be used as a basis for designing the transmittance $T_r$ of the sensing region 140. The transmittance $T_r$ of the sensing region 140 may include different ranges based on actual needs. In some embodiments, the transmittance $T_r$ of the sensing region 140 may be between 0.05% and 5% (0.05%≤the transmittance $T_r$≤5%), such as 1% or 2%, but it is not limited thereto. Since the transmittance $T_r$ of the sensing region 140 is high enough (for example, the transmittance $T_r$ of the sensing region 140 is greater than or equal to 0.05%), the sensing region 140 may reduce the visibilities of the sensing region 140 and/or the sensing element 150, while also taking the sensing function of the sensing element 150 into account.

In some embodiments, the transmittance of the holes 143 may be between 70% and 98% (70%≤the transmittance of the holes 143≤98%), but it is not limited thereto.

Figure 4:
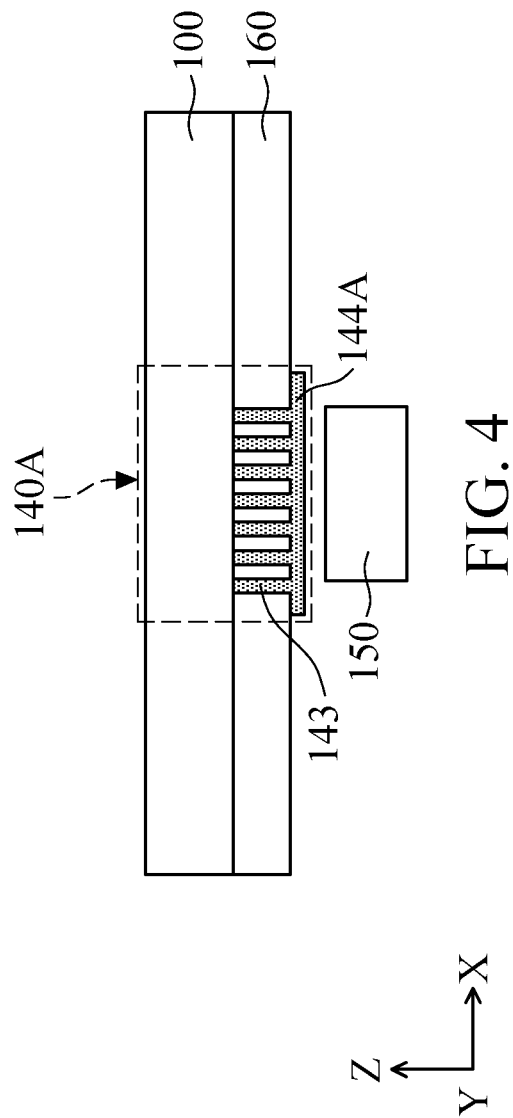
FIG. 4 is a side view of another sensing region and the sensing element, in accordance with some embodiments.

In the following description, identical or similar elements are denoted by identical or similar symbols, and some related descriptions are not repeated. FIG. 4 is a side view of another sensing region 140A and the sensing element 150, in accordance with some embodiments. The difference between the sensing region 140A of FIG. 4 and the sensing region 140 of FIG. 3 is that the transparent material 144 may be in a solid state during the manufacturing process (such as OCA tape or double-sided tape), so the transparent material 144 may be disposed under the holes 143 and under the surface of the light shielding layer 160. As for the transparent material 144A, it may be in a liquid state during the manufacturing process (such as glue), so the holes 143 in the light shielding layer 160 may at least partially be filled with the transparent material 144A. In some embodiments, the thickness of the transparent material 144 and/or the transparent material 144A is between 0.20 mm and 0.40 mm (0.20 mm≤the thickness≤0.40 mm), such as 0.25 mm, 0.30 mm, or 0.35 mm, but it is not limited thereto.

Figure 5:
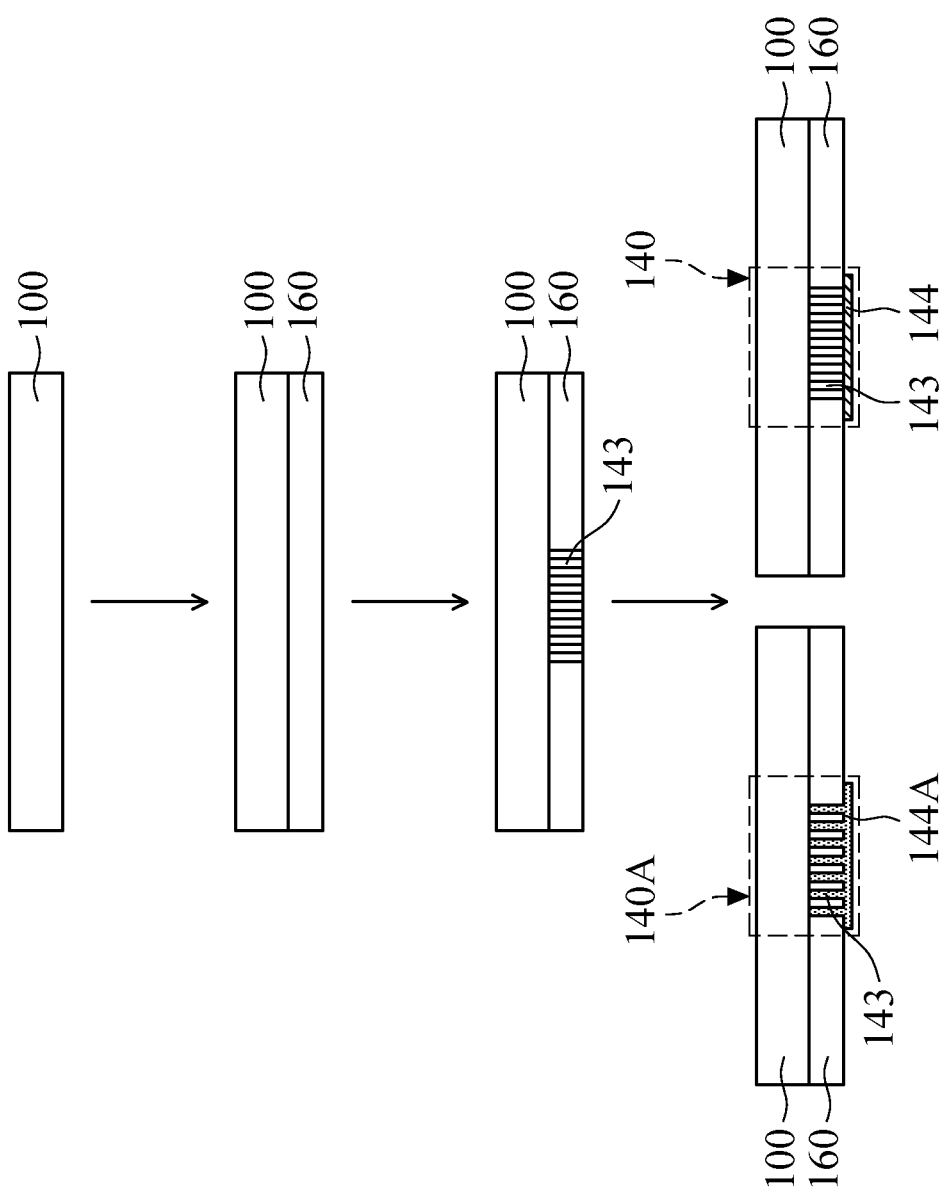
FIG. 5 is a flow diagram of forming the sensing region, in accordance with some embodiments.

FIG. 5 is a flow diagram of forming the sensing region 140/140A, in accordance with some embodiments. First, the light shielding layer 160 is disposed (such as using a coating process) under the bottom surface of the capping substrate 100. Next, the holes 143 are formed in the portion of the light shielding layer 160 that corresponds to the sensing element 150. Next, the transparent material 144/144A is disposed in and/or under the light shielding layer 160. For example, the holes 143 may be filled with transparent material 144A, or the transparent material 144 may be disposed under the holes 143 and under the surface of the light shielding layer 160.

Please refer to FIG. 6 to FIG. 12. FIGS. 6-12 are top views of sensing regions 140B-140H according to some embodiments, illustrating the shape and the arrangement of holes 143B-143H. It should be noted that, in FIGS. 6-12, the contours of the sensing region 140B-140H are illustrated as being circular-shaped, but the sensing region 140B-140H may include other contours in some other embodiments. For example, if the sensing element 150 is rectangular-shaped, then the sensing regions 140B-140H may be designed accordingly to have a rectangular contour.

Figure 6:
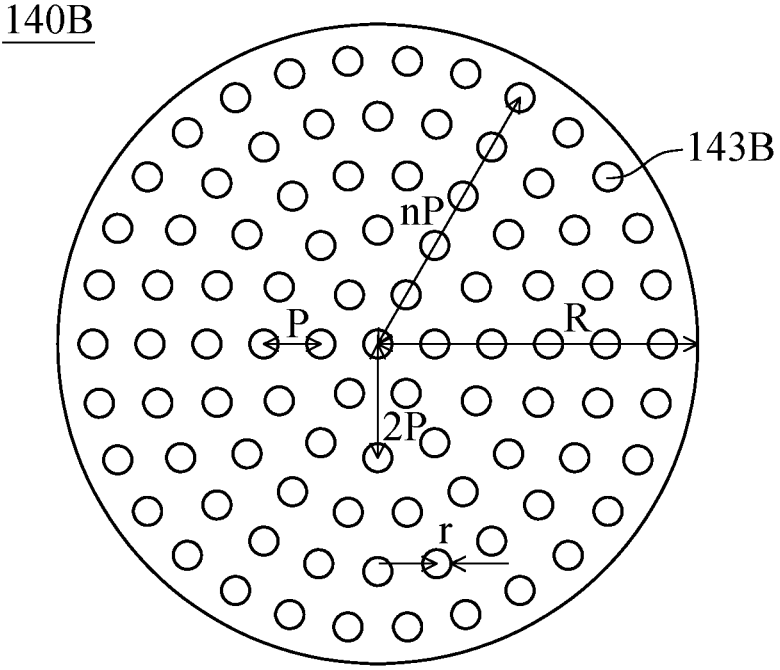
FIG. 6 is a top view of holes that are arranged as concentric circles, wherein any two adjacent holes have an equal pitch.

FIG. 6 is a top view of the holes 143B that are arranged in concentric circles, wherein any two adjacent holes 143B have an equal pitch P. It should be noted that the pitch P is the distance between the centroid of any two adjacent holes 143. For example, in this embodiment, the holes 143B are circular-shaped, so the pitch P is the distance between the centers of the circle of any two adjacent holes 143B. As described above, the transmittance of the sensing region 140B may be controlled by Equation 1. As for this embodiment, it may be assumed that the sensing element 150 has a radius of R, each of the holes 143B has an identical shape and volume, and each of the holes 143B has a radius of r. In addition, the number of holes 143B is N. Then, Equation 1 may be rewritten as the following Equation 2:

$$T_r\% = \frac{N\pi r^2}{\pi R^2} \times T_s\% \quad \text{(Equation 2)}$$

N: the total number of holes 143B;
R: the radius of the sensing element 150;
r: the radius of each hole 143B;
$T_r$: the transmittance of the sensing region 140B; and
$T_s$: the transmittance of the capping substrate 100.

For the sake of calculation of the number N of holes 143B, it is assumed that there are n rounds of holes 143B (the $n^{th}$ round is the round that is closest to the edge). In addition, the number in the first round, the second round, . . . , the $n^{th}$ round of the holes 143B may be denoted as $n_1$, $n_2$, . . . , and $n_n$. Then, Equation 3 may be derived as follows:

$$N = n_1 + n_2 + \ldots + n_n \quad \text{(Equation 3)}$$

N: the total number of holes 143B;
$n_1$: the number of holes 143B in the first round;
$n_2$: the number of holes 143B in the second round; and
$n_n$: the number of the holes 143B in the $n^{th}$ round.

Since any two adjacent holes 143B have an equal pitch P, the radius of the first round, the second round, . . . , and the $n^{th}$ round is P, 2P, . . . , and nP. Therefore, the circumference of the first round, the second round, . . . , and the $n^{th}$ round is $2\pi P$, $2\pi \times 2P$, . . . , and $2\pi \times nP$. Also, since the circumference of each round may be written as the sum of the distance between the holes 143B in each round, Equation 4, Equation 5, and Equation 6 may be derived as follows:

$2\pi P = n_1 P$ (Equation 4)
$2\pi \times 2P = n_2 P$ (Equation 5)
$2\pi \times nP = n_n P$ (Equation 6)

n: the total number of rounds of holes 143B;
$n_1$: the number of holes 143B in the first round;
$n_2$: the number of holes 143B in the second round;
$n_n$: the number of the holes 143B in the $n^{th}$ round; and
P: the distance between the centers of the circle of any two adjacent holes 143B.

By using Equation 4, Equation 5, and Equation 6, the number of holes 143B in the first round, the second round, . . . , and the $n^{th}$ round $n_1$, $n_2$, . . . , and $n_n$ may be rewritten as $2\pi$, $4\pi$, . . . , and $2n\pi$. Equation 3 may be substituted, then Equation 2 may be substituted accordingly, and Equation 7 may be derived as follows:

$$T_r\% = \frac{(2\pi + 4\pi + \ldots + 2n\pi)\, \pi r^2}{\pi R^2} \times T_s\% \quad \text{(Equation 7)}$$

n: the total number of rounds of holes 143B;
R: the radius of the sensing element 150;
r: the radius of each hole 143B;
$T_r$: the transmittance of the sensing region 140B; and
$T_s$: the transmittance of the capping substrate 100.

Also, since the area in which the holes 143B are located is substantially equal to the area of the sensing element 150, the radius nP of the nth round is substantially equal to the radius R of the sensing element 150. Therefore, Equation 8 may be derived:

$nP = R$ (Equation 8)

n: the total number of rounds of holes 143B;
P: the distance between the centers of the circle of any two adjacent holes 143B; and
R: the radius of the sensing element 150.

Equation 7 is substituted with Equation 8, and total number of rounds n of the holes 143B is substituted with the pitch P between any two adjacent holes 143B and the radius R of the sensing element 150. Then, Equation 9 may be derived:

$$T_r\% = \frac{2\pi r^2}{R^2} \cdot \frac{\left(1 + \frac{R}{P}\right)\frac{R}{P}}{2} \times T_s\% \quad \text{(Equation 9)}$$

P: the distance between the centers of the circle of any two adjacent holes 143B;
R: the radius of the sensing element 150;
r: the radius of each hole 143B;
$T_r$: the transmittance of the sensing region 140B; and
$T_s$: the transmittance of the capping substrate 100.

Then, Equation 9 may be further simplified to achieve Equation 10:

$$P = \frac{\frac{T_s \pi r^2}{T_r R} \pm \sqrt{\left(\frac{T_s \pi r^2}{T_r R}\right)^2 + 4\frac{T_s}{T_r}\pi r^2}}{2} \quad \text{(Equation 10)}$$

P: the distance between the centers of the circle of any two adjacent holes 143B;
R: the radius of the sensing element 150;
r: the radius of each hole 143B;
$T_r$: the transmittance of the sensing region 140B; and
$T_s$: the transmittance of the capping substrate 100.

Based on the calculation in some embodiments, the pitch P is between 22.77 μm and 771.86 μm (22.77 μm≤the pitch P≤771.86 µm). That is, when the holes are arranged in concentric circles, and any two adjacent holes have an equal pitch, some embodiments of the present disclosure provide equation for designing the sensing region. For example, the size of the holes and the distance between adjacent holes may be calculated.

It should be noted that Equation 1 already provides controlling the transmittance Tr of the sensing region by adjusting the area A of the sensing element, the total area a of holes, and the transmittance $T_s$ of the capping substrate. That is, in some embodiments, the total area a of the holes may be used as a basis for designing the transmittance $T_r$ of the sensing region, so the holes may be in various shapes and/or various arrangements and/or designs.

Figure 7:
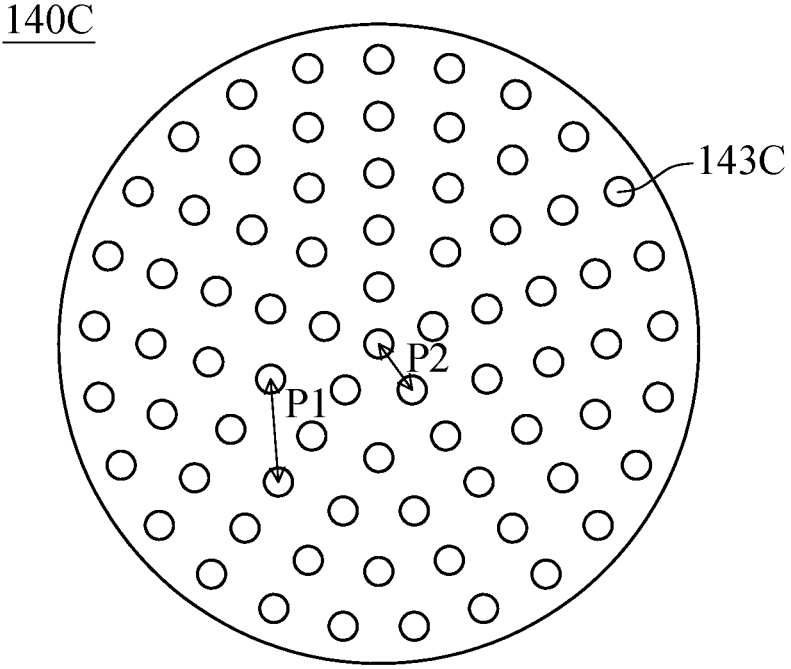
FIG. 7 is a top view of holes that are arranged as concentric circles, wherein any two adjacent holes do not necessarily have an equal pitch.
Figure 8:
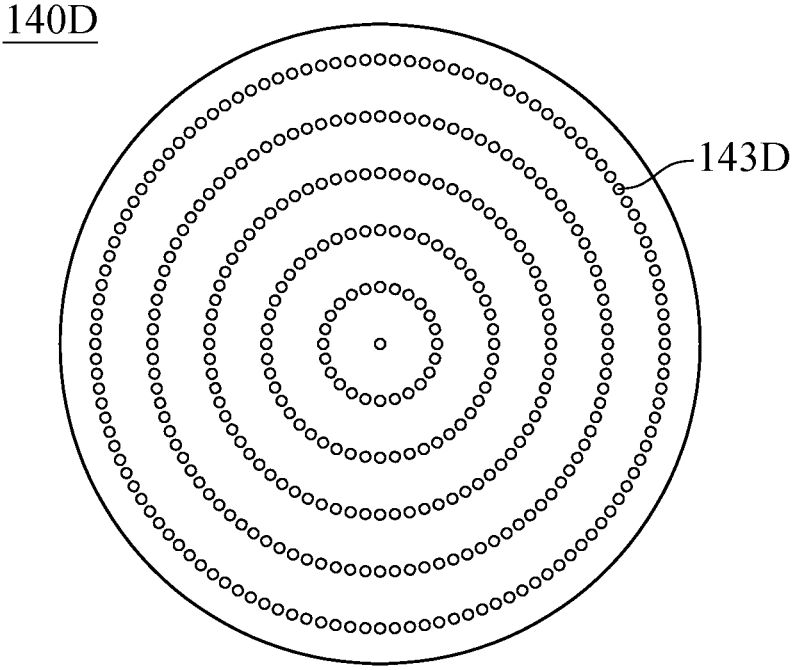
FIG. 8 is a top view of holes that are arranged in concentric rings.
Figure 9:
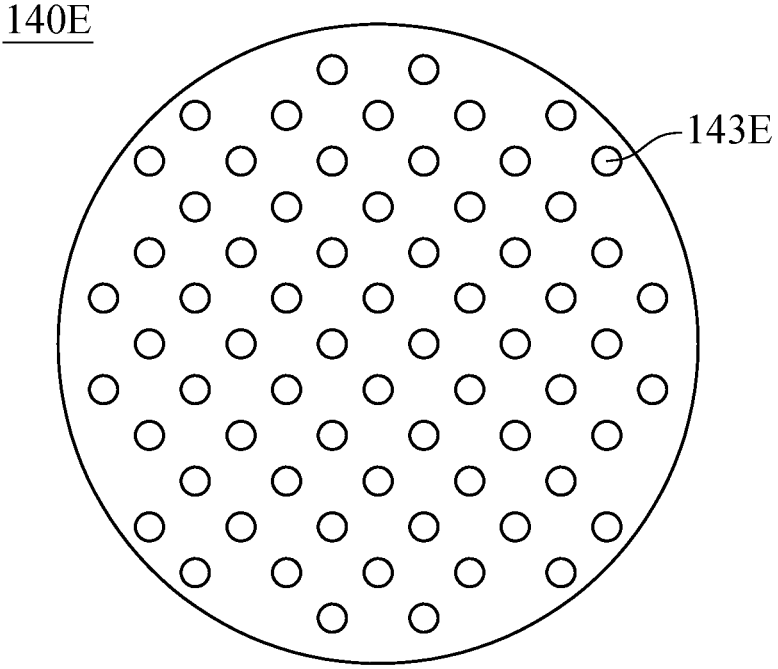
FIG. 9 is a top view of holes that are arranged in a staggered pattern.
Figure 10:
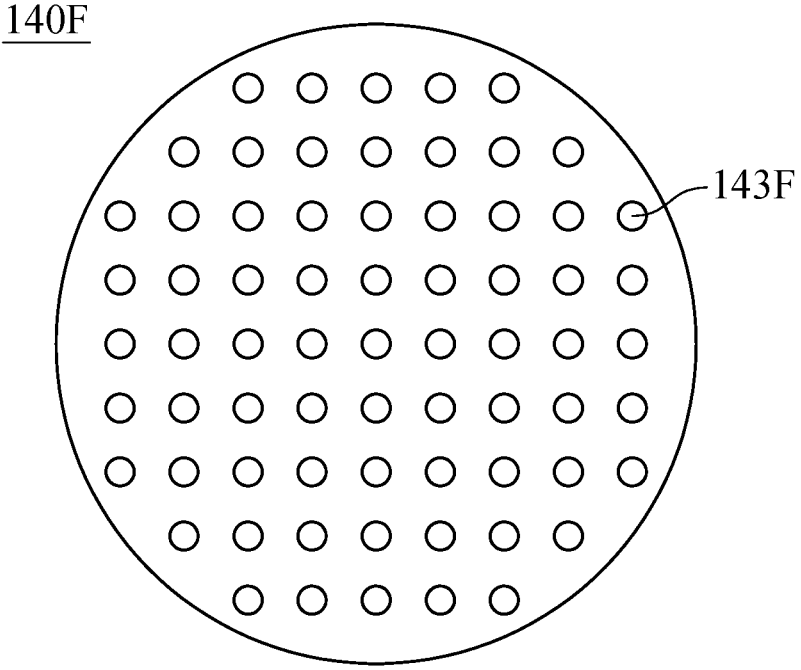
FIG. 10 is a top view of holes that are arranged regularly.
Figure 11:
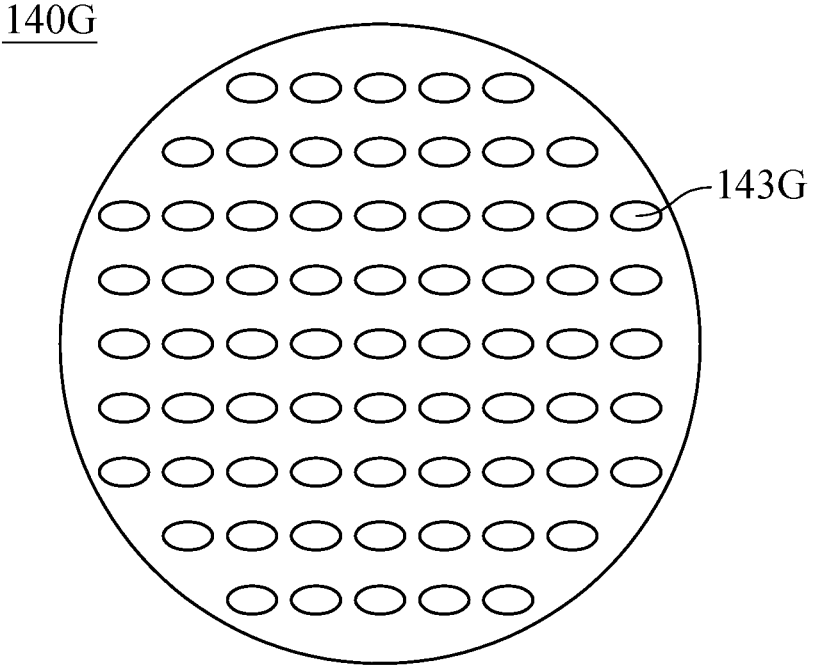
FIG. 11 is a top view of holes that are arranged regularly, wherein each hole is elliptical-shaped.
Figure 12:
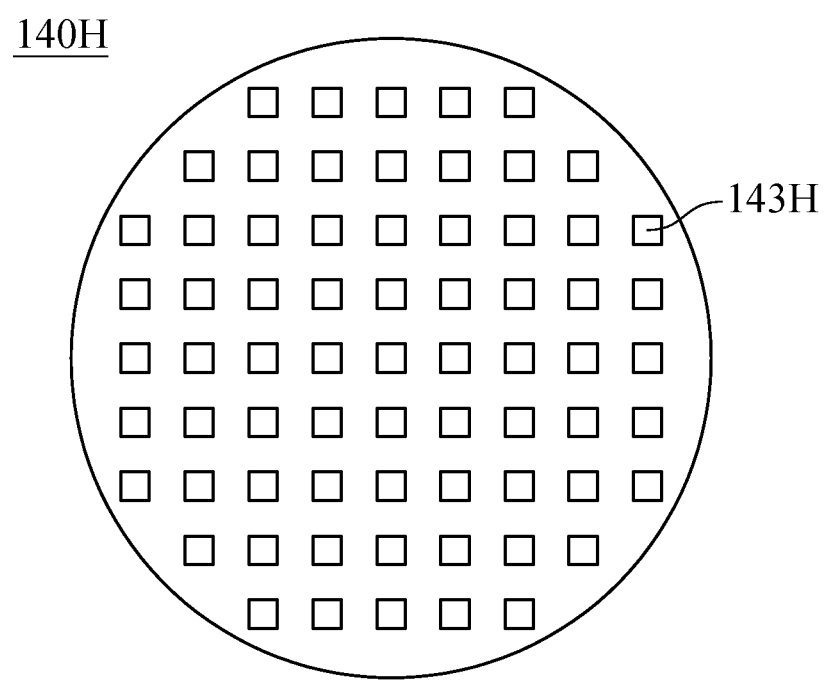
FIG. 12 is a top view of holes that are arranged regularly, wherein each hole is quadrilateral-shaped.

FIG. 7 is a top view of the sensing region 140C, the sensing region 140C includes holes 143C that are arranged as concentric circles, and any two adjacent holes 143C do not necessarily have an equal pitch. For example, the pitch P1 is different from the pitch P2. FIG. 8 is a top view of the sensing region 140D, and the sensing region 140D includes holes 143D that are arranged in concentric rings. FIG. 9 is a top view of the sensing region 140E, and the sensing region 140E includes holes 143E that are arranged in a staggered pattern. For example, the holes 143E may be aligned for every two columns or every two rows. FIG. 10 is a top view of the sensing region 140F, and the sensing region 140F includes holes 143F that are arranged regularly. Each of the holes 143F is circular-shaped. FIG. 11 is a top view of the sensing region 140G, and the sensing region 140G includes holes 143G that are arranged regularly, wherein each of the holes 143G is elliptical-shaped. FIG. 12 is a top view of the sensing region 140H, and the sensing region 140H includes holes 143H that are arranged regularly, wherein each of the holes 143H is quadrilateral-shaped. In some embodiments, the holes may include other shape, such as triangular-shaped. In some embodiments, the holes may include a combination of different arrangements.

As described above, the holes may be in various shapes and/or various arrangements and/or designs. In some embodiments, the holes may be circular, elliptical, quadrilateral, or polygonal, but the shape is not limited thereto. In some embodiments, the holes may be arranged in a staggered way or in an irregular way. The holes may be regular arranged, or arranged as concentric circles or in concentric rings, but the arrangement is not limited thereto. In some embodiments, every hole is substantially equal in shape and area. In some embodiments, the distance between any two adjacent holes is the same. In some embodiments, the distance between any two adjacent holes may not be the same.

According to some embodiments of the present disclosure, a display panel is provided. The display panel includes a sensing region. The display panel includes a capping substrate, a light shielding layer, and a transparent material. The light shielding layer is disposed under the capping substrate. The light shielding layer includes a plurality of holes. The transparent material may increase the amount of transmission of the light that can pass through and/or reduce the amount of reflection of the light that can pass through, so as to reduce the visibilities of the sensing region and/or the sensing element.

In particular, based on some embodiments of the present disclosure, when a user uses the electronic device, he or she can barely see the sensing region and/or the sensing element with the naked eye, thereby enhancing user experience. Furthermore, some embodiments of the present disclosure provide equations related to different parameters, and the equations may be used as a basis for designing the transmittance of the sensing region. Since the transmittance of the sensing region is high enough, the sensing region may reduce the visibilities of the sensing region and/or the sensing element, while also taking the sensing function of the sensing element into account.

The foregoing outlines features of several embodiments, so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A display panel comprising a sensing region corresponding to a sensing element, wherein the display panel comprises:
   a capping substrate;
   a light shielding layer disposed under the capping substrate and comprising a plurality of holes;
   a transparent material disposed under the light shielding layer; and
   a display unit disposed under the capping substrate,
   wherein the plurality of holes and the transparent material correspond to the sensing region,
   wherein in a normal direction of the capping substrate, a first distance between the display unit and the capping substrate is greater than a second distance between the sensing element and the capping substrate.

2. The display panel as claimed in claim 1, wherein a transmittance of the transparent material is between 70% and 99.5% (70%≤the transmittance of the transparent material≤99.5%).

3. The display panel as claimed in claim 2, wherein the transmittance of the transparent material is between 85% and 98% (85%≤the transmittance of the transparent material≤98%).

4. The display panel as claimed in claim 1, wherein the plurality of holes are formed by laser ablation.

5. The display panel as claimed in claim 1, wherein the transparent material is an adhesive tape material.

6. The display panel as claimed in claim 1, wherein a thickness of the transparent material is between 0.20 mm and 0.40 mm.

7. The display panel as claimed in claim 1, wherein at least one of the plurality of holes is circular-shaped, elliptical-shaped, quadrilateral-shaped, or polygonal-shaped.

8. The display panel as claimed in claim 1, wherein any two adjacent of the plurality of holes have an equal pitch, and the pitch is between 22.77 µm and 771.86 µm.

9. An electronic device, comprising:
   a sensing element; and
   a display panel comprising a sensing region corresponding to the sensing element, wherein the display panel comprises:

a capping substrate disposed above the sensing element;

a light shielding layer disposed between the capping substrate and the sensing element and comprising a plurality of holes;

a transparent material disposed between the capping substrate and the sensing element; and a display unit disposed under the capping substrate, wherein the plurality of holes and the transparent material correspond to the sensing region, wherein in a normal direction of the capping substrate, a first distance between the display unit and the capping substrate is greater than a second distance between the sensing element and the capping substrate.

10. The electronic device as claimed in claim 9, wherein the sensing element has an area (A), the plurality of holes have a total area (a), the capping substrate has a transmittance ($T_s$), and the sensing region has a transmittance ($T_r$), wherein the transmittance ($T_r$) of the sensing region is defined by the following equation:

$$T_r\% = \frac{a}{A} \times T_s\%.$$

11. The electronic device as claimed in claim 10, wherein the transmittance ($T_s$) of the capping substrate is between 70% and 95% (70%<the transmittance ($T_s$)<95%).

12. The electronic device as claimed in claim 11, wherein the sensing element has a radius (R), each of the plurality of holes has a radius (r), any two adjacent of the plurality of holes have an equal pitch (P), and the pitch (P) satisfies the following equation:

$$P = \frac{\frac{T_s \pi r^2}{T_r R} \pm \sqrt{\left(\frac{T_s \pi r^2}{T_r R}\right)^2 + 4\frac{T_s}{T_r}\pi r^2}}{2}.$$

13. The electronic device as claimed in claim 9, wherein a transmittance of the transparent material is between 70% and 99.5% (70%<the transmittance of the transparent material<99.5%).

14. The electronic device as claimed in claim 13, wherein the transmittance of the transparent material is between 85% and 98% (85%<the transmittance of the transparent material<98%).

15. The electronic device as claimed in claim 9, wherein the plurality of holes are formed by laser ablation.

16. The electronic device as claimed in claim 9, wherein a thickness of the transparent material is between 0.20 mm and 0.40 mm.

17. The electronic device as claimed in claim 9, wherein at least one of the plurality of holes is circular-shaped, elliptical-shaped, quadrilateral-shaped, or polygonal-shaped.

18. The electronic device as claimed in claim 9, wherein any two adjacent of the plurality of holes have an equal pitch, and the pitch is between 22.77 μm and 771.86 μm.

19. The electronic device as claimed in claim 9, wherein the sensing element has a radius (R) that is about 500 mm, and each of the plurality of holes has a radius (r) that is between 15 μm and 80 μm.

20. The electronic device as claimed in claim 9, wherein the display panel comprises a display region and a peripheral region, and the sensing element is disposed in the peripheral region.

* * * * *